3,006,869
METHOD OF INCREASING THE FLOWABILITY OF UNCURED VINYL ESTER RESIN FOAMS

Edmund H. Schwencke, New York, N.Y., and William J. Smythe, Ridgewood, N.J., assignors, by mesne assignments, to Union Carbide Corporation, New York, N.Y., a corporation of New York
No Drawing. Filed Dec. 29, 1953, Ser. No. 401,044
2 Claims. (Cl. 260—2.5)

This invention relates to methods of increasing the flowability of uncured plasticized vinyl ester resin foams which may be used to produce a final cured product having a cellular structure therein.

This invention is a modification of or improvement on the invention described in copending application Serial No. 389,678, filed Nov. 2, 1953, now Patent No. 2,666,036, dated January 12, 1954. That application describes and claims a method of producing a cellular structure in a polymerized material from the group consisting of polyvinyl chloride and copolymers of vinyl chloride and vinyl acetate dispersed in sufficient plasticizer to provide a free flowing mass, which comprises dispersing an inert gas throughout such a free flowing mass in a closed container while maintaining within said container a pressure exceeding 100 lbs. per sq. in. and discharging said mass from said container under the influence of the pressure maintained in said container and at a temperature below the gelling temperature of said mass, said mass being discharged in ungelled state in the form of an expanded, creamy foam.

The method so described produces an uncured vinyl resin foam of excellent quality having a remarkably uniform cellular structure which is quite stable. Furthermore, it is possible by the use of said method to produce foam of relatively low density, a quality which is of great importance in the manufacture of many products. Moreover, as explained in said copending application, it is possible, in practicing the method described therein, to control the density of the foam by varying the gas pressure and absorption of the gas into the plasticized resin.

It has been found, however, that as was to be expected, the flowability of foam so produced is considerably less than the flowability of the free flowing plasticized material from which the foam was made. Moreover, the lower the density of the foam, the greater the loss of flowability. This loss of flowability has imposed serious limitations on the use of the foamed material. For example, in filling molds of anything except the simplest character, it is difficult to insure that all recesses of the mold are filled with foam, and defective pieces often result. Also mold surface detail is often defective in finished, cured pieces.

It has also been found to be difficult or impossible to use such foam for dipping, slushing or other similar coating operations because of its reduced flowability.

It is an object of the present invention to provide a method of increasing the flowability of uncured foamed vinyl resins so as to increase their utility in many applications where it has been difficult or impossible to use them to advantage.

Other objects and advantages of the invention will appear hereinafter.

According to the present invention, we propose to form a vinyl resin foam by incorporating an inert gas therein, preferably by the method of said copending application, said foam having a density which is lower than that desired, and then to subject the foam to shear forces which break some of the gas filled cells and release the gas therefrom. This not only increases the density of the foam, but it increases the flowability of the foam. But surprisingly, it increases the flowability of the foam to a greater degree than would normally be expected. That is, a batch of foam of a given density as originally discharged will normally have a certain degree of flowability. But a batch of foam which results from subjecting a foam of lower density to shear forces sufficient to increase its density to the given density of the first batch will have a degree of flowability considerably in excess of that of the first batch.

Flowability of foam is not measurable except by methods which are too cumbersome to be of value in ordinary commercial operations in which extreme accuracy is not required. In such operations, therefore, rule of thumb methods are employed to obtain foam of the desired characteristics. Increase of density (as indicated by decrease of volume) is useful as a rough indicator of flowability, and a skilled workman can soon determine how much to increase the density of foam of any given original density to provide the degree of flowability required.

Thus, in the simplest form of the invention, a vinyl resin foam of relatively low density and low flowability is produced, preferably by the method described in said copending application, and such foam is placed in a suitable container and stirred with a paddle or other tool which, when moved in the foam, will subject the foam to shear forces. The foam in the container should have a free surface from which the released gas may escape. However, the container may be either an open container, in which case the foam is at atmospheric pressure, or it may be a closed container in which the foam may be maintained at any desired pressure, either above or below atmospheric pressure, while being subjected to shear.

The stirring (or other application of shear) is continued until the decrease in volume of the foam in the container indicates that the desired density and flowability has been reached, and for this purpose the container may be provided with a graduated scale which may be calibrated for the particular formulation which is being treated.

In some cases, however, the stirring may be continued until decrease in volume ceases, which, on its face, would seem to indicate that all of the gas has been released. At least, the material no longer has any appearance of foam, but looks, superficially, like unfoamed material of similar formulation. Its flowability is substantially that of the original unfoamed material. Very surprisingly, however, when such material is subjected to curing temperatures under conditions such that it may expand, it is found to produce a cured product consisting of high density foam of excellent quality. Apparently this results from the fact that a certain amount of gas which is dissolved into the material during the application of gas pressure is not released either by the subsequent release of pressure or by the stirring, but is released only by subsequent application of curing temperatures. Surprisingly, too, this retained gas is not released by prolonged storage at atmospheric pressures. It is possible, therefore, to prepare the material and to store and ship it to customers as needed.

The above described method of increasing flowability may also be easily adapted to a continuous operation as well as a batch operation. In such cases the low density foam is discharged continuously, and instead of being placed in a container, is caused to flow through a passage in which controlled amounts of shear would be applied thereto. This may be done by stirring as above described, or it may be done by the use of baffles, or by causing the material to pass through screens, orifices or the like which are adapted to apply shear forces thereto.

The method described herein is applicable to polyvinyl chloride and to copolymers of vinyl chloride and vinyl acetate.

The material produced by this method may be cured by any of several methods known in the art. Preferably, however, such material is cured by subjecting it to an electrical field created between two electrodes of a high frequency circuit.

In using the term "cure" in this specification, we are using it in its popular, but perhaps not strictly accurate, meaning of converting material from raw to finished state. It is now generally accepted in the industry that the term "fuse" is more accurate as applied to the conversion of plasticized vinyl resins to finished state by application of heat.

One of the very important results of the invention is to make it possible to produce foams having sufficient flowability to be usable for dipping, slushing or other similar coating operations in which it has hitherto been difficult or impossible to use foamed vinyl resins.

It will be understood that the invention may be variously modified and embodied within the scope of the subjoined claims.

We claim as our invention:

1. The method of producing a foam of high flowability from polymerized material from the group consisting of polyvinyl chloride and copolymers of vinyl chloride and vinyl acetate dispersed in sufficient plasticizer to provide a free flowing mass, which comprises dispersing an inert gas under pressure throughout such a free flowing mass in a closed container, discharging said mass from said container under the influence of the pressure maintained in said container and at a temperature below the gelling temperature of said mass, said mass being discharged in ungelled state in the form of an expanded, creamy foam, collecting said foam in a mass having a free surface from which released gas may escape, and subjecting said foam to shear forces to break some of the gas filled cells and release gas therefrom sufficient to increase the flowability of the mass to the desired level.

2. The method according to claim 1 in which the material is subjected to shear forces which release incorporated gas from the material until no further decrease of volume occurs.

References Cited in the file of this patent

UNITED STATES PATENTS

| | | |
|---|---|---|
| 2,475,191 | Marvin et al. | July 5, 1949 |
| 2,525,966 | Smith et al. | Oct. 17, 1950 |
| 2,575,259 | Cox et al. | Nov. 13, 1951 |
| 2,598,018 | Rogers | May 27, 1952 |
| 2,649,287 | McChesney | Aug. 18, 1953 |
| 2,666,036 | Schwencke | Jan. 12, 1954 |

OTHER REFERENCES

Noble: Latex in Industry, 2nd edition, September 1953, pages 615 and 616, published by Rubber Age, New York, N.Y.